May 8, 1945.  S. G. FALK  2,375,639
SPEED GOVERNOR FOR GRAMOPHONES
Filed Nov. 29, 1943
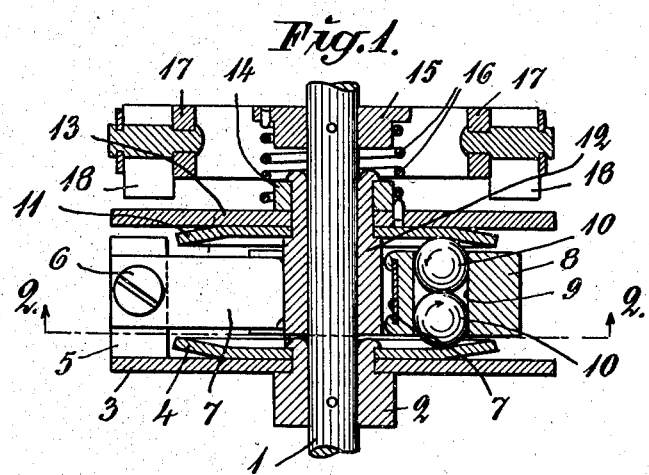
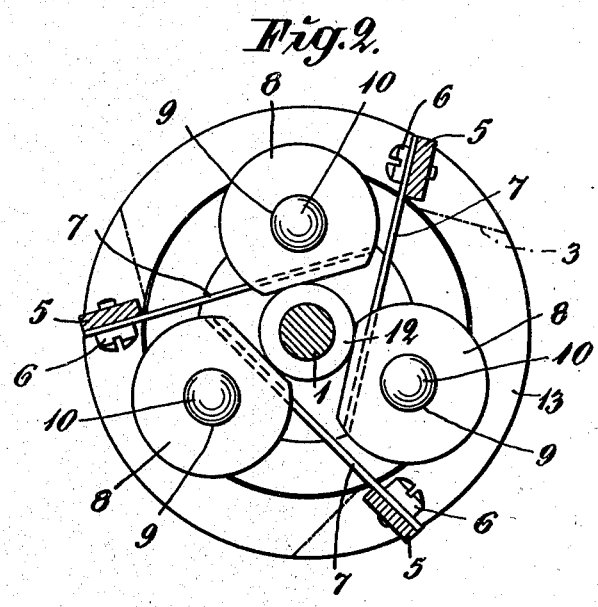
Inventor
S. G. Falk Patented May 8, 1945

2,375,639

UNITED STATES PATENT OFFICE 2,375,639

SPEED GOVERNOR FOR GRAMOPHONES

Sven Gustaf Falk, Stockholm, Sweden, assignor to Svenska Aktiebolaget Philips, Stockholm, Sweden, a corporation of Sweden Application November 29, 1943, Serial No. 512,198
In Sweden August 18, 1942

3 Claims. (Cl. 188—187)

On speed governors used in gramophones high requirements are made as regards the sensibility of the governor and its ability to adjust itself rapidly. Since, moreover, the space available for the governor is very much limited, it has in practice proved difficult to obtain a speed governor quite suitable for gramophones.

In solving this problem it has been found to be suitable to employ deflection bodies which upon increase of speed are moved radially or substantially radially outwards from the rotating spindle of the governor under the influence of the centrifugal force for the purpose of actuating brake elements.

According to the present invention, which is based on the above-mentioned realization, the problem has been solved in such a manner that a very great sensibility and a rapid adjusting power are obtained while maintaining a compact construction.

According to the invention, each of the deflection bodies carried by springs is provided with balls cooperating in pairs, which balls are adapted upon the deflection of the bodies to roll against one another and against disks or the like, which are situated on opposite sides of the deflection bodies, considered in the direction of the rotating spindle, and one of which is movable in the last-mentioned direction and combined with a brake element, besides which said disks have such a shape that the brake element is displaced into braking position as the balls are rolling outwards.

The brake element consists suitably of a disk mounted under free motion on the spindle but connected thereto by means of a torsion spring which normally carries the disk with it and, moreover, maintains the disk flexibly set in a certain normal position from which it is displaced into braking position when a certan velocity of rotation is exceeded.

An embodiment of the invention is illustrated in the accompanying drawing.

Figure 1 shows a vertical section through the intended speed governor. Figure 2 shows a transverse section viewed in the direction of the arrows extending from line 2—2 of Figure 1.

Attached to the spindle 1, the velocity of which is to be governed, is a sleeve 2 or the like, to which are secured a plate 3, a disk 4. From the plate 3 are turned up lugs or ears 5, into which are threaded screws 6, by means of which leaf springs 7 are fastened to the lugs. The leaf springs 7, which extend inwardly and occupy a tangential position relatively to a circle concentrically surrounding the spindle 1, carry at their inner ends deflection bodies 8 penetrated by openings 9 in which balls 10 are inserted. As shown in Figure 1, these balls are arranged in pairs close to one another in each opening. The lower ball contacts with and is carried by the disk 4, and the upper ball is in contact with a corresponding upper disk 11. The two disks have conical edge portions which face each other. The disk 11 is attached to a sleeve 12 or the like which is mounted under free motion on the spindle 1. Besides, secured to the sleeve 12 is a brake element 13 in the form of a plate or the like which together with the disk 11 is fixed on the sleeve 12 by a stop ring 14 or the like. Above the sleeve 12 there is secured to the spindle 1 a third sleeve 15, to which is fastened one end of a torsion spring 16 concentrically surrounding the spindle, the other end of said torsion spring being attached to the brake element 13. In this manner, the disk 11 is held flexibly against the upper balls which in turn contact with the lower balls carried by the lower disk 4. Above the brake element 13 there is stationarily disposed a ring 17, to which brake shoes 18 or the like are secured.

The governor operates in the following manner:

Supposing that the velocity of rotation of the spindle 1 is increased beyond a certain normal velocity. The consequence of this is that the deflection bodies 8 are swung outwardly, the balls 10 then rolling outwardly towards the circumference of the disks. The balls roll in the directions indicated by the arrows in Figure 1 and on this occasion cooperate with one another and with the disks without sliding friction arising, thus a great sensibility being ensured. According as the deflection bodies are swung outwardly, the balls obviously act upon the upper disk 11 so that the brake element 13 is raised and is moved into cooperation with the brake shoes 18, resulting in a retardation of the motion of rotation of the brake element 13. This retarding effect is transmitted by the spring 16 to the sleeve 15 and the spindle 1, the motion of rotation of which is hereby braked until the deflection bodies return to the normal position and the spindle rotates again at normal velocity.

On account of the manner in which the brake element 13 is connected to the spindle 1, an advantageous smooth change is obtained on braking. Moreover, the brake element and the disk 11 will partake in the motion of rotation of the spindle up to the moment at which the brake element is retarded in consequence of the contact with the brake shoes 18, whereby sliding friction in conjunction with the balls is avoided as much as possible and a great sensibility is obtained. Due to the fact that the springs carrying the deflection bodies are arranged in the manner stated above, a compact construction is rendered possible.

Obviously, the intended governor may be used in combination with apparatus or machines other than gramophones.

I claim:

1. A speed governor, for gramophones, comprising a number of deflection bodies carried by springs and subjected to the influence of the centrifugal force for movement outwardly from the rotating spindle, of the governor, balls cooperating in pairs and mounted in said deflection bodies and adapted to roll against one another and against disks disposed on opposite sides of said deflection bodies, considered in the direction of said rotating spindle and a brake element combined with one of said disks and adapted in consequence of the shape of said disks and the cooperation of said balls with the same to be displaced together with one of said disks into braking position upon said balls rolling outwards between said disks, said brake element being connected to the rotating spindle of said governor by connecting means in such manner that it together with said disk normally is entrained by said spindle, but in a flexible manner is permitted to be retarded upon being braked in the braking position.

2. A speed governor according to claim 1, characterized in that said deflection bodies are carried by leaf springs which occupy a tangential position relatively to a circle concentrically surrounding said rotating spindle.

3. A speed governor according to claim 1, characterized in that said connecting means is adapted to hold one of said disks flexibly against said balls.

SVEN GUSTAF FALK.